United States Patent

Joseph et al.

[11] 4,250,376
[45] Feb. 10, 1981

[54] APPARATUS FOR RANGE FINDING EQUIPMENT

[75] Inventors: James D. Joseph, Oakdale, Minn.; Dennis J. Wilwerding, Littleton, Colo.

[73] Assignee: Honeywell Inc., Minneapolis, Minn.

[21] Appl. No.: 58,964

[22] Filed: Jul. 20, 1979

[51] Int. Cl.³ .............................................. G01J 1/36
[52] U.S. Cl. ................................... 250/204; 250/201
[58] Field of Search ............... 250/201, 204, 208, 209, 250/578; 354/25; 356/141, 152, 4

[56] References Cited

U.S. PATENT DOCUMENTS

| | | | |
|---|---|---|---|
| 4,002,899 | 1/1977 | Stauffer | 250/209 |
| 4,083,056 | 4/1978 | Nakamura et al. | 250/201 |
| 4,132,888 | 1/1978 | Kondo | 354/25 |
| 4,189,232 | 2/1980 | Asano et al. | 356/4 |

*Primary Examiner*—David C. Nelms
*Attorney, Agent, or Firm*—Charles J. Ungemach

[57] ABSTRACT

Apparatus for determining the direction a lens should be moved in order to provide a proper focus of a remote object on a predetermined plane. A plurality of radiation detectors are positioned to receive radiation in first and second patterns from the object and to produce signals in accordance therewith. A first group of radiation detectors, produces signals indicative of the radiation received on the first pattern while a second group of radiation detectors produces signals indicative of the radiation received, in the second pattern. The two patterns coincide at the proper focus but at other than the proper focus position, the two patterns are spaced from one another in a direction which depends upon the direction the lens should be moved to achieve proper focus. The absolute value of the difference between the signal from a first detector in the first pattern and the signal from a first detector in the second pattern is compared with the absolute value of the difference between the signal from a second detector in the first pattern and the signal from a second detector in the second pattern. The result is summed over a predetermined range and a characteristic of the summed value is indicative of the direction the lens should be moved for proper focus.

11 Claims, 6 Drawing Figures

APPARATUS FOR RANGE FINDING EQUIPMENT

BACKGROUND OF THE INVENTION

In a copending application of Norman L. Stauffer, Ser. No. 912,688, filed June 5, 1978, now U.S. Pat. No. 4,185,191, a range determination system is shown which is useable in a through-the-lens camera for positioning the taking lens at a desired correct focus position with respect to a remote object within the field of view. That system utilizes a plurality of small detectors such as charge coupled devices (CCD) or charge injection devices (CID) mounted in an array to receive radiation from the scene being viewed. The detectors are arranged in pairs with each pair being mounted behind a small lenslet so that each pair receives a view of the exit pupil of the taking lens but one of the detectors in each pair receives radiation primarily from a first portion of the taking lens while the other of the detectors in each pair receives radiation primarily from a different portion of the taking lens. The result is to create two similar curves indicative of the radiation distribution pattern from the scene being viewed. At the proper focus position the two curves coincide, but as the object changes position with respect to the camera, the two curves move with respect to each other to indicate an out-of-focus situation. The two curves move with respect to each other in a first direction when the object is closer to the camera than the desired focus position and move in an opposite direction with respect to each other as the object moves further from the camera than the desired focus position. By determining the direction of movement of the two curves with respect to each other, it is therefore possible to determine the direction that the taking lens has to be moved to achieve the desired focus position.

In a copending application of Norman L. Stauffer and Dennis J. Wilwerding, Ser. No. 16,595, filed Mar. 1, 1979, an improvement on the above-mentioned copending application Ser. No. 912,688 was disclosed wherein a method and apparatus for determining the direction in which the two similar curves need to be moved in order to produce the coincidence indicative of a proper focus position is disclosed. In that application a value indicative of the slope of the curves at predetermined points in obtained and this value is multiplied by the difference in the value of the output of the detectors at such points. The product is summed over a predetermined range. The summation value is substantially zero when the two curves coincide but will have a characteristic such as plus or minus to indicate the direction the taking lens must be moved when the two curves do not coincide.

It has been found that the apparatus for multiplying the signal indicative of slope by the signal indicative of difference is more complicated and costly than desired in a system in which cost, complexity and weight are important factors (such as in hand-held cameras).

SUMMARY OF THE INVENTION

The apparatus of the present invention eliminates the need for obtaining a product and in lieu thereof operates to (1) produce a first signal representative of the absolute magnitude of the difference between the outputs of two detectors, one from each of the curves, (2) produce a second signal indicative of the absolute magnitude of the difference between the outputs of two other detectors, one from each of the curves, and (3) subtract the two signals and then sum the result over a predetermined range. The resultant summation value, as is the case in the above-mentioned copending application Ser. No. 16,595, will be substantially zero when the two curves coincide, will have a first characteristic such as a negative sign when the two curves are displaced in the first direction and a second characteristic such as a positive sign when the two curves are displaced in the opposite direction.

DETAILED DESCRIPTION OF THE PREFERRED EMBODIMENTS

Figure 1:
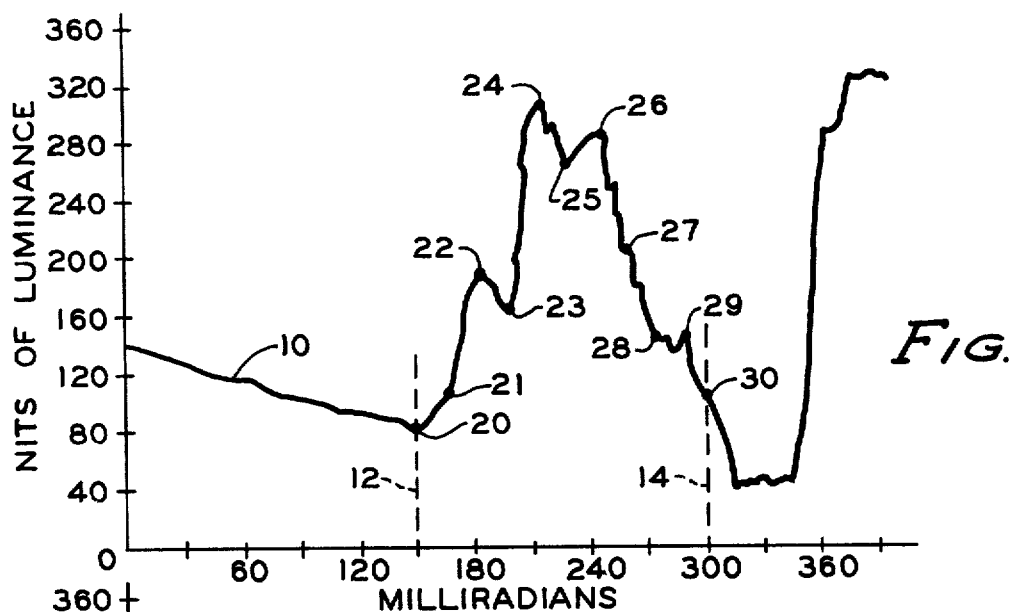
FIG. 1 shows a spatial distribution pattern as may be produced by the detectors at the proper focus position of the scene being viewed.

In FIG. 1, a curve 10 is shown representing the pattern of light intensity that might be produced by the the detectors of the above-mentioned copending application when the subject being viewed is in proper focus at the image plane of the taking lens. The lenslets in front of the detectors in the above-mentioned copending application are placed at the same distance from the taking lens of the camera as the film and receive at least a portion of the same light distribution pattern from the scene being viewed. The detectors in the array produce output signals in accordance with the radiation intensity they receive so as to produce the curve 10. The detector array might consist of a single row of detector pairs or may comprise several rows or some pattern such as parallel rows or crossed rows or other configurations. Rows of detectors might be mounted horizontally so as to receive light along a horizontal portion of the pattern, vertically so as to receive light along a vertical portion of the pattern or diagonally so as to receive the light pattern as it exists along a diagonal of the scene being viewed. An advantageous arrangement is to mount one or more rows of detectors diagonally since normal repetitions of patterns in nature seldom occur in diagonal directions while vertically arranged scenes, such as picket fences or forests and horizontally arranged scenes such as sky lines and roadways, might produce some difficulty when detector arrays are mounted vertically or horizontally. The detectors may extend clear across the scene being viewed or may be mounted to receive only a portion of the total distribution pattern available.

In FIG. 1, the ordinate of curve 10 is shown as luminance and the curve is seen to extend from a low of about 40 nits to a high of about 360 nits while the abscissa is in milliradians across the image being viewed and the curve is seen to extend from 0 to approximately 375 milliradians. The amount of luminance will, of course, vary with the lighting and composition of the scene being viewed and the size of the scene image at the image plane will vary with the focal length of the lens. In FIG. 1, the luminance is that equivalent to a normally lighted room and the extent of the curve is approximately one half of the angular field of a 50 millimeter focal length lens.

In FIG. 1, two dashed lines 12 and 14 are shown extending vertically from about 150 milliradians and about 300 milliradians respectively. For simplicity in the following analysis, it will be assumed that the detector array receives the pattern of FIG. 10 in this area from 150 milliradians to 300 milliradians and, also for simplicity, it will be assumed that there are 11 detector pairs between these two points. In actual practice, the number of detector elements would more likely be approximately 32 pairs of detectors which would be mounted in an array approximately five millimeters in length which, with a 50 millimeter lens, would extend approximately 100 milliradians across the distribution pattern.

In FIG. 1, it will be assumed that the 11 detector pairs are equally spaced (although equal spacing is not necessary and in fact for periodic patterns it may be desirable to have an equal spacing) and produce output signals at points along curve 10 identified by reference numerals 20, 21, 22, 23, 24, 25, 26, 27, 28, 29 and 30 which output signals correspond in magnitude to the amount of radiation they receive. It is seen in FIG. 1 that the luminance at point 20 is approximately 80 nits, that at point 21 approximately 120 nits, that at point 22 approximately 190 nits, that at point 23 approximately 160 nits, that at point 24 approximately 300 nits, that at point 25 approximately 260 nits, that at point 26 approximately 280 nits, that at point 27 approximately 200 nits, that at point 28 approximately 140 nits, that at point 29 approximately 140 nits and that at point 30 approximately 100 nits. In FIG. 1, the situation is as it would exist when the taking lens is in focus so that both of the detectors in each of the pairs are receiving the same amount of radiation and produce the same magnitude output signal.

Figure 2:
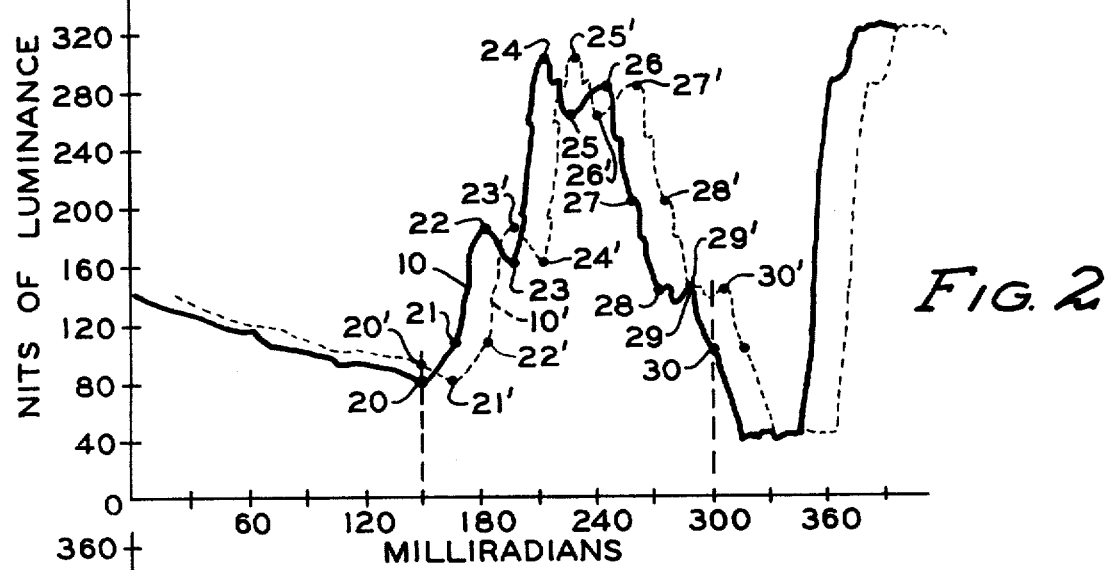
FIG. 2 shows two patterns like FIG. 1, one of which is displaced from the other to show an out-of-focus condition in a first direction.

FIG. 2 shows the pattern of FIG. 1 as it might exist when the object is further away from the taking lens than was the case in FIG. 1. For simplicity, curve 10 in FIG. 2 is shown in the same position as it was in FIG. 1 and represents the distribution pattern that is sensed by the first of the pairs of detectors in the array. In actual practice, curve 10 would more likely move to the left as the object moves further away from the camera. A similar curve identified by reference numeral 10' is shown to the right of curve 10 and represents the distribution pattern that is sensed by the other of the detectors in each pair. As was the case in FIG. 1, the first of the pairs of the detectors produces outputs signals of magnitudes shown at points 20-30 but the other of the detectors in each pair produces output signals of magnitudes shown at points 20'-30'. Thus, while the first of detectors in the first pair still receives approximately the same radiation, the second of the detectors in the first pair receives radiation as shown by point 20' and, as seen, this luminance differs by about 10 nits, that is, the output at 20' is approximately 90 nits while the output at point 20 is still approximately 80 nits. In similar fashion, the luminance received by the detector producing the output at point 21 will still be approximately 100 nits but the luminance received by the other of that causes an output at point 21' which is approximately 80 nits. This continues throughout the distribution pattern with one curve being higher or lower than the other in most cases although occasionally, such as at points 29 and 29', where the amount of radiation received by both detectors in the pair is approximately the same. As mentioned above, curve 10 would most likely move to the left as curve 10' moved to the right but the principle of changing outputs between points 20 and 20', etc. is the same.

Figure 3:
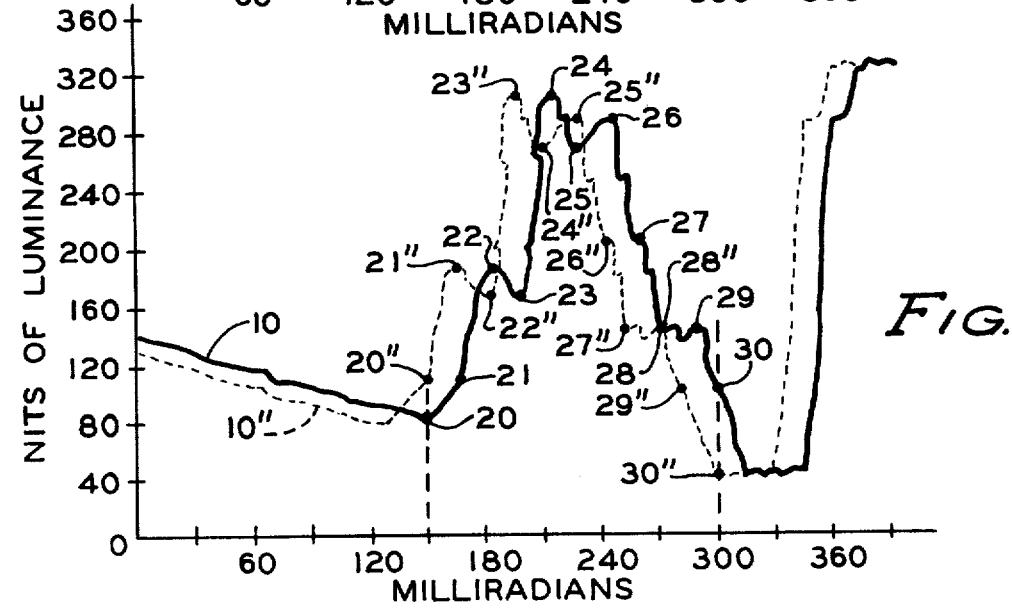
FIG. 3 shows two patterns like that of FIG. 1 with one of the curves displaced from the other to show an out-of-focus condition in a direction opposite of that of FIG. 2.

In FIG. 3, the distribution patterns are shown as curves 10 and 10", corresponding to what might exist when the object to be focused upon moved closer to the lens than was the case in FIG. 1. Again, in actual practice, curve 10 would most likely move to the right as curve 10" moved to the left but for simplicity, curve 10 has been shown in the same position as it occupied in FIG. 1 while curve 10" is displaced to the left. In FIG. 3, the amount of luminance received by the detectors at points 20-30 is the same as it was in FIG. 1 but the radiation received by the other of the detectors in each pair has shifted so that at point 20" the detector is producing an output indicating approximately 100 nits of luminance which is about 20 nits more than that received by the detector producing the output at point 20. As with FIG. 2, the difference in radiation received by each of the pairs throughout the distribution pattern is generally different although occasionally, such as at points 28 and 28" in FIG. 3, the detectors are receiving approximately the same radiation.

In FIG. 2, if the object were to move further and further away from the lens, curve 10' would move further and further to the right with respect to curve 10 and the difference in radiation received by the pairs of detectors in each set would change as this occurred. In FIG. 3, if the object were to move closer and closer to the lens, the curve 10" would move further to the left with respect to curve 10 and again the radiation received by the detectors in each pair would change as this occurred.

In the above-referenced copending application Ser. No. 16,595, it was shown how the slopes of the curves from about point 20 to about point 24 in both FIGS. 2 and 3 were generally positive while the slopes of the curves between points 24 and 30 in both FIGS. 2 and 3 were generally negative and it was shown that the difference between the curves in FIGS. 2 and 3 varied in an opposite sense so that when the slope was multiplied by the difference, a positive sign generally occurred in FIG. 2 while a negative sign generally occurred in FIG. 3 as an indication of which direction the curves needed to be moved for coincidence. While this system operates satisfactorily, it was found more desirable to eliminate the circuitry for performing the multiplication in order to simplify and save cost. Accordingly, we discovered that similar results could be obtained without multiplication by summing the difference between absolute values obtained from different points on the two curves over the range involved. For example, in FIG. 2 it may be noticed that with curve 10' to the right of curve 10, the absolute value of the difference between a point on curve 10 and the next succeeding point on curve 10' is relatively small. Thus, in FIG. 2, the absolute magnitude of the difference between point 21 on curve 10 (approximately 120 nits) and the next succeeding point 22" on curve 10' (also approximately 120 nits) is very small. On the other hand, in FIG. 3, where curve 10" is to the left of curve 10, the absolute value of the difference in those same points; i.e., point 21 on curve 10 (approximately 120 nits) and point 22" on 10" (approximately 160 nits) is significantly larger. Likewise, in FIG. 2, the absolute magnitude of the difference between point 22 on curve 10 (approximately 190 nits) and the previous point 21' on curve 10' (approximately 80 nits) is relatively large while in FIG. 3 the absolute magnitude of the difference between the same two points; (i.e., point 22 on curve 10 which is approximately 190 nits and point 21" on curve 10" which is also approximately 190 nits) is quite small. The fact that two of the differences in the above examples were approximately zero is coincidental to the situation chosen in FIGS. 2 and 3 and although the differences at such points will not normally be zero they will, nevertheless, be relatively small compared to the larger differences. Thus, in FIG. 2, if one were to subtract the absolute magnitude of the differences between crossed succeeding points (21-22' and 22-21', etc.) on curves 10 and 10', the result would be negative; i.e., $$|120 \text{ nits} - 120 \text{ nits}| - |190 \text{ nits} - 80 \text{ nits}| = -80 \text{ nits} \quad (1)$$

On the other hand, in FIG. 3, the difference between the absolute values of the same set of points (21-22" and 22-21") would be positive; i.e., $$|120 \text{ nits} - 160 \text{ nits}| - |190 \text{ nits} - 190 \text{ nits}| = +40 \text{ nits} \quad (2)$$

We have determined that this situation generally exists throughout the range of both curves and that the equation:

$$\sum_{1}^{m-1} |a_n - b_{n+1}| - |a_{n+1} - b_n| = V \quad (3)$$

(where m is the number of detectors in the range, $a_n$ is a first detector output on a first curve, $a_{n+1}$ is the next succeeding detector output on the first curve, $b_n$ is a second detector output on a second curve and of the pair of detectors which includes $a_n$, $b_{n+1}$ is the next succeeding detector output on the second curve and of the pair of detectors which includes $a_{n+1}$ and V is the resulting signal) will be negative for situations such as shown in FIG. 2 (where curve 10' is to the right of curve 10) and will be positive for situations such as in FIG. 3 (where curve 10" is to the left of curve 10). It is the fact that the sign of the summation changes as one curve moves from the right to the left of the other curve which enables us to provide a signal for driving the taking lens to the correct focal position. More particularly, as in FIG. 2, when the curve 10' is to the right of curve 10, the summation of equation 3 will be negative and the taking lens will have to be moved away from the camera and towards the object in order to bring the curves back into coincidence but, as in FIG. 3 where curve 10" is to the left of curve 10, the summation of equation 3 will be positive and the taking lens will have to be moved more towards the camera and away from the object to obtain a proper focus condition.

Figure 4:
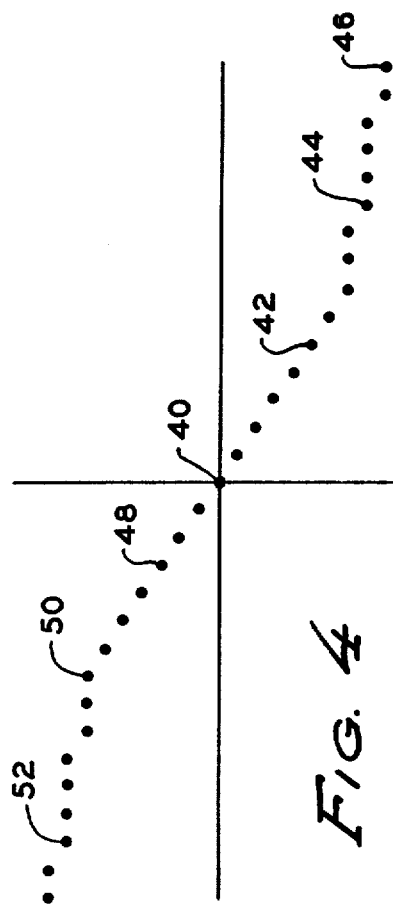
FIG. 4 shows a graph with points therealong representing various summations obtained for various focus conditions.

FIG. 4 shows a graph of values that might be obtained for the summation given by equation 3 as the object moves away from the focus position in both directions. The ordinate represents values (V) obtained by the summation while the abscissa represents increasing amounts of displacement, right and left, of the two patterns from coincidence at the center and thus the out-of-focus extent. Point 40 in FIG. 4 shows that the summation is zero when the displacement of the two patterns is as shown in FIG. 1 which is the "in focus" condition. The value of the summation becomes generally more negative as shown by points 42, 44 and 46 for example as the object to be focused on moves further and further from the camera as in FIG. 2. As the object moves closer and closer to the camera, as in FIG. 3, the value of the summation becomes generally more positive with further and further displacements from proper focus as is shown generally by points 48, 50 and 52. With certain repetitive patterns, the value of the sum may again move towards the zero axis with greater displacements from focus but in nearly all cases, this only occurs when the displacement is quite large. In rare cases, at very large displacements, the summation could actually change signs to produce an erroneous output but this is, as indicated, a rare situation involving very unusual repetitive patterns containing mostly high frequency components having nearly no low frequency components.

Accordingly, it is seen that by detecting the sign of the summation shown in equation 3, a signal may be created which can be used to direct the positioning of the taking lens of the camera towards the desired focus position.

Figure 5:
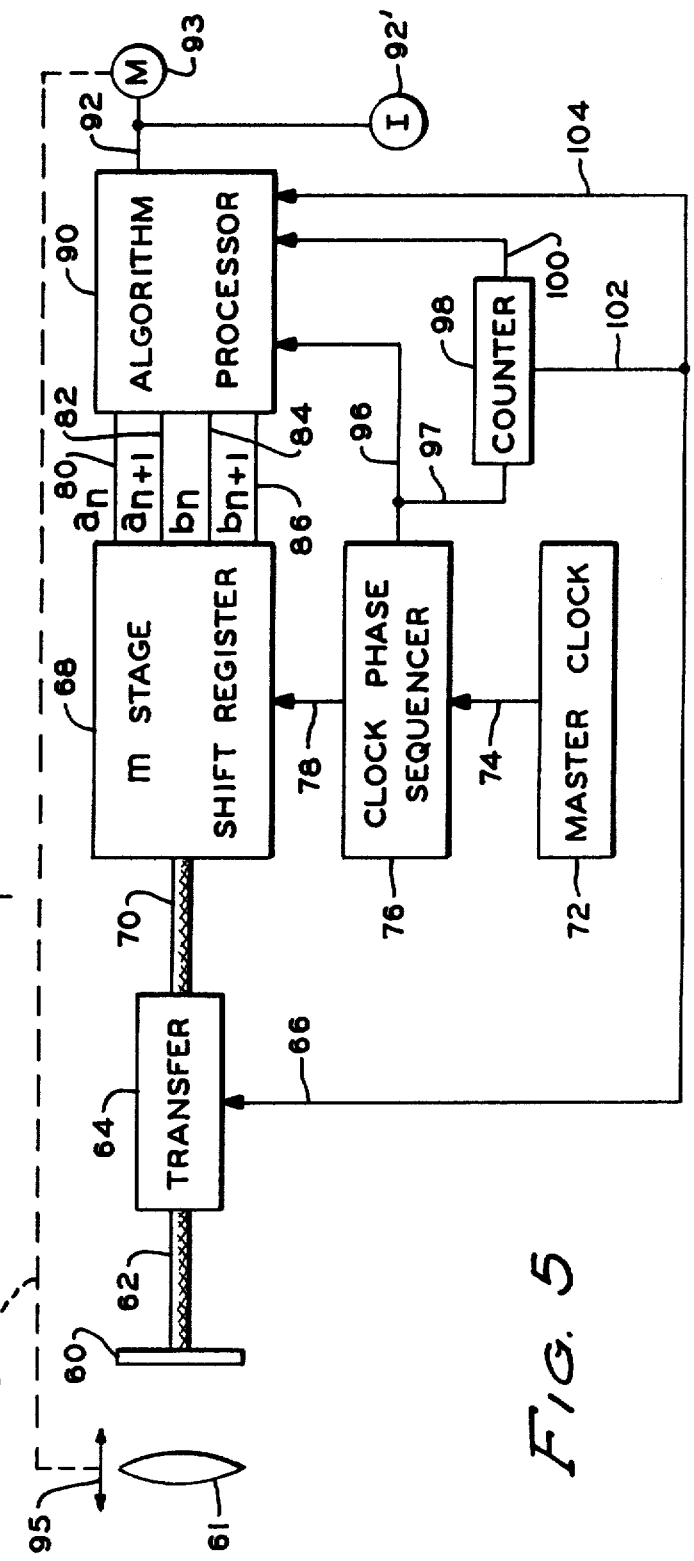
FIG. 5 shows a block diagram of circuitry for the determination of direction of displacement of one pattern with respect to the other.

FIG. 5 shows a block diagram of a circuit which can extract the values for $a_n$, $a_{n+1}$, etc. and $b_n$, $b_{n+1}$, etc. so as to create the desired summation signal for driving the taking lens of a camera. In FIG. 5, the detector array is identified by reference numeral 60 and is shown mounted to the right of a moveable lens 61 which may be the taking lens of the camera. Array 60 may be like that shown in the above-referred-to copending application Ser. No. 912,688 and the outputs of the individual detectors are presented by transfer means such as cable 62 to a transfer device 64. Transfer means 62 may be part of a solid state device which also includes transfer device 64 and transfer device 64 acts as a switch which operates upon the receipt of a signal on a line 66 to transfer the various outputs of the detectors on line 62 to an m stage shift register 68 by further transfer means such as cable 70. Cable 70 and shift register 68 may also be formed as part of the solid state device including the transfer means 62 and the transfer device 64.

A master clock 72 produces a clock output signal on a line 74 to a clock phase sequencer 76 which produces a three phase pulse signal on a line 78 to the shift register 68. The signals on cables 62 and 70, indicative of the amount of radiation received by each of the detectors in the array 60, are stored in the shift register 68 and upon the occurrence of a first clock phase pulse from the clock phase sequencer 76, four signals identified as $a_n$, $a_{n+1}$, $b_n$ and $b_{n+1}$ will appear on lines 80, 82, 84 and 86 respectively. As will be later described, these signals are in proper order with the "a" signals appearing on lines 80 and 82 and "b" signals appearing on lines 84 and 86. The pulses from the clock phase sequencer 76 that cause signals to appear in this proper order, will hereinafter be referred to as valid data pulses. After the first valid data pulse, the next clock phase pulse from sequencer 76 will cause the m stage shift register 68 to produce outputs as follows: on line 80 indicative of $b_n$, on line 82 of $b_{n+1}$, on line 84 of $a_{n+1}$, and on line 86 of $a_{n+2}$. Since these signals are in different order; i.e., the "a" signals appear on lines 84 and 86 while the "b" signals appear on lines 80 and 82, the information is not useful and the pulse from the clock phase sequencer 76 causing this to occur is not a valid data pulse. On the third pulse from the clock phase sequencer 76, the output on line 80 becomes $a_{n+1}$, that on line 82 $a_{n+2}$, that on line 84 $b_{n+1}$ and that on line 86 $b_{n+2}$ which again is in the proper sequence so that the pulse from the clock phase sequencer 76 causing this output is again a valid data pulse. It is seen that every other pulse from the clock phase sequencer 76 on line 78 produces a valid data pulse or, in other words, one where line 80 contains an "a" term, line 82 contains an "a" term increased by 1, line 84 contains a "b" term and line 86 contains a "b" term increased by 1. As will be seen in connection with the description of FIG. 6, only the valid data pulses are used to determine the absolute magnitude values of the differences between points on the two curves for purposes of obtaining the required summation of equation 3. The process continues for one complete cycle until line 80 carries the signal from one of the pair of detectors in the next-to-last or m−1 of the detector pairs, line 82 contains the signal from one of the pair of detectors in the last or m of the detector pairs, line 84 carries the signal from the other of the pair of detectors in the next-to-last or m−1 of the detector pairs and line 86 carries the signal from the other of the pair of detectors in the last or m of the detector pairs. Accordingly, if there are 11 detectors, as is used in the present example, there will be 10 valid data pulse signals on line 78 causing 10 proper signals to appear on lines 80–86. Lines 80–86 are shown in FIG. 5 to be connected to an algorithm processor 90 which operates, as will be described in connection with FIG. 6, to produce an output on line 92 indicative of the sign of equation 3 above. The output on line 92 may be used to actuate an indicator 92' to show the direction the lens 61 must be moved to achieve proper focus or, as also shown in FIG. 5, to drive a reversible motor 93 which, by means of a mechanical connection shown as dashed line 94, automatically moves lens 61 in the direction of arrows 95 to the proper focus position.

Valid data pulses, that is, every other pulse from the clock phase sequencer 76, are also presented on a line 96 to the algorithm processor 90 and via a line 97 to a counter 98 which counts the valid data pulses and produces an output pulse on line 100 after m−1 detector pairs have been examined. Thus, in the example given with 11 detectors, there will be 10 valid data pulses for each cycle of operation and upon the completion of the tenth valid data pulse, the counter 98 will produce an m−1 pulse on line 100 which is shown connected to the algorithm processor 90 for purposes to be explained in connection with FIG. 6. Upon the occurrence of what would be the next valid data pulse or in the example given, the 11th valid data pulse, the counter 98 will produce an m signal on a line 102 indicative of the fact that all of the detector outputs have been examined; that is, all of the contents of the shift register 68 have been presented to the algorithm processor 90 and the cycle is now complete. This m signal on line 102 is presented to the algorithm processor 90 via a line 104 for purposes to be explained in connection with FIG. 6 and also via line 66 to the transfer switch 64 so that upon completion of the cycle, the signals on the individual detectors of array 60 may again be transferred into the m stage shift register 68 for use in the next cycle of operation.

Figure 6:
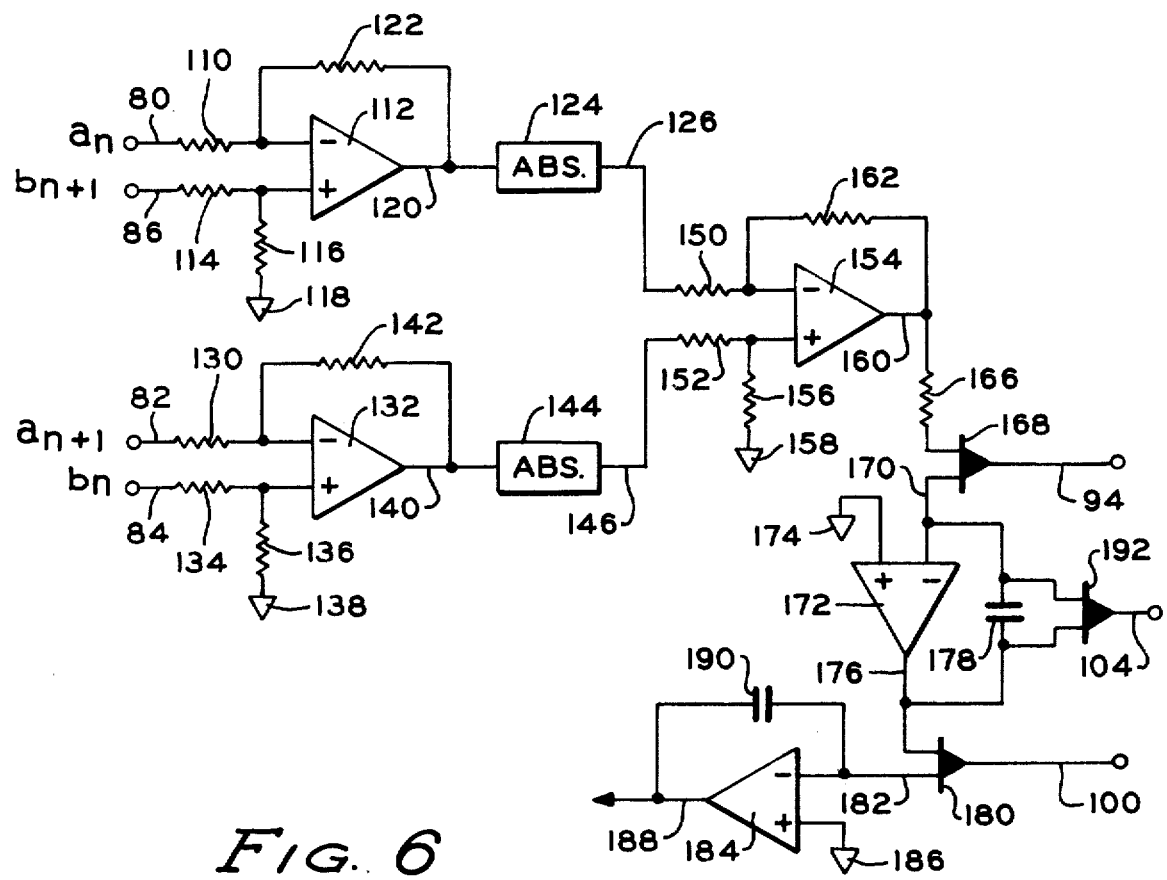
FIG. 6 shows a schematic diagram of the algorithm processor of FIG. 5.

In FIG. 6 a schematic diagram of the algorithm processor 90 is shown and the various lines leading to the algorithm processor of FIG. 5 bear the same reference numerals in FIG. 6. As shown in FIG. 6, the $a_n$ line from the shift register 68 appears on line 80 where it is fed through a resistor 110 to the negative input of an operational amplifier 112. The $b_{n+1}$ line from the shift register 68 appears on line 86 where it is fed through a resistor 114 to the positive input of operational amplifier 112. A resistor 116 is connected between the positive input of operational amplifier 112 and signal ground at 118. Operational amplifier 112 has an output on line 120 and a resistor 122 is connected between the output on line 120 and the negative input terminal so that operational amplifier 112 operates to subtract the two inputs received at its terminals. Thus the output on line 120 will be a signal indicative of the difference $a_n - b_{n+1}$. Line 120 is connected to an absolute value circuit 124 which has an output on line 126 indicative of the absolute value of the signal on line 120.

The $a_{n+1}$ signal from the shift register 68 appears on line 82 and is fed through a resistor 130 to the negative input terminal of an operational amplifier 132. In similar fashion, the $b_n$ signal appearing on line 84 is passed through a resistor 134 to the positive input terminal of operational amplifier 132. A resistor 136 is connected between the positive input terminal of operational amplifier 132 and signal ground at 138. The output of operational amplifier 132 appears on a line 140 and a resistor 142 is connected between the output line 140 and the negative input terminal so that operational amplifier 132, like operational amplifier 112, acts to subtract the two inputs received at its terminals. Thus, the signal on line 140 is indicative of the value $a_{n+1} - b_n$. The signal on line 140 is presented to an absolute value circuit 144 which has an output on line 146 indicative of the absolute value of the signal on line 140. The absolute value signals on lines 126 and 146 are presented through a pair of resistors 150 and 152 respectively to the negative and positive input terminals respectively of an operational amplifier 154. The positive input terminal of operational amplifier 154 is connected through a resistor 156 to signal ground at 158. Operational amplifier 154 has an output on line 160 and a resistor 162 is connected between output line 160 and the negative input terminal so that operational amplifier 154, like operational amplifiers 132 and 112, acts to subtract the two inputs received at its terminals. Thus the output signal on line 160 will be a signal indicative of the difference between the absolute values $|a_n - b_{n+1}|$ and $|a_{n+1} - b_n|$.

The signal on line 160 is presented through a resistor 166 to a switch 168, the other side of which is connected via a line 170 to the negative input terminal of an operational amplifier 172. The positive input terminal of operational amplifier 172 is connected to signal ground at 174. The input of switch 168 is connected to line 94 which is the valid data pulse line of FIG. 5 and every time a valid data pulse occurs, switch 168 will become conductive and the signal on line 160 through resistor 166 will pass to the input of operational amplifier 172. In the absence of a valid data pulse, switch 168 will be open and any signal on line 160 will not pass to the operational amplifier 172. By this means, only signals whch are representative of valid data, are passed to the operational amplifier 172.

The output of amplifier 172 appears on a line 176 and a capacitor 178 is connected across operational amplifier 172 from the output line 176 to the negative input terminal so that operational amplifier 172 acts as an integrator and sums the signals which appear at its negative input terminal. By this means, the signal appearing on line 176 will be representative of the summation of the signals on line 170 and thus will provide the output signal V of equation 3 when m−1 of the detectors has been sampled. This signal on line 176 is presented by means of a switch 180 and a line 182 to the negative input terminal of an operational amplifier 184, the positive input terminal of which is connected to signal ground at 186. The output of operational amplifier 184 appears on a line 188 and a capacitor 190 is connecged between the negative input terminal of amplifier 184 and the output on line 188. Since there is no resistor at the input of operational amplifier 184, the output on line 188 will go to a negative or positive saturation potential depending upon the sign of the signal at its input on line 182. The signal on line 182 will be present only when switch 180 is in a "on" condition and this occurs when a pulse occurs on line 100 which, as seen in FIG. 5, is from the m stage divider 98 and is indicative of the count having completed m−1 valid data pulses. Switch 180 therefore is turned on at the conclusion of the summation of all the signals which exist on line 160 and the sign of this signal controls the sign of the output that will appear on line 188 at the output of operational amplifier 184. Thus, after m−1 operations of the circuit, switch 180 will close and the summed output from operational amplifier 172 (indicative of the sum of all of the signals which were presented to it during the cycle) will appear on line 182 and be either positive or negative. If positive, a negative potential will appear on line 188 and if negative, a positive potential will appear on line 188. The signal on line 188 may then be fed to conventional motor control circuit to operate motor 93 of FIG. 5 and thus move in a first or opposite direction according to the sign of the signal on line 188 so as to obtain the proper focus position.

A switch 192 is shown in FIG. 6 connected across capacitor 178 which stores the integrated output of operational amplifier 172 and the input to switch 192 is connected to line 104 which, as seen in FIG. 5, is the m signal indicative of the fact that the cycle is now complete. When the signal occurs on line 104, switch 192 operates to drain the charge on capacitor 178 and thus reset the system for operation at the next consecutive cycle.

It is thus seen that I have provided a method and apparatus for producing a signal operable to move the taking lens of a camera or other optical system to a desired focus position. It is seen that I provide either a positive or negative signal to indicate the direction of desired focus and that this is accomplished without the use of multiplying circuitry. Many obvious alterations and changes to the circuitry described in connection with the preferred embodiment will occur to those skilled in the art. For example, the various clocks, inverters, integrators and summing circuits shown in the figures may be replaced with alternate logic equivalents and while the system has been described in connection with a through-the-lens focus system, the same principles may be employed in other auto focus cameras or range finding equipment wherein two different paths for light may be available to two separate detector arrays such as is found in the Stauffer U.S. Pat. No. 4,002,899 issued Jan. 11, 1977. Accordingly, I do not wish to be limited by the specific showings used in connection with the preferred embodiments described herein but rather intend only to be limited by the scope of the following claims.

The embodiments of the invention in which an exclusive property or right is claimed are defined as follows:

1. Apparatus for use with an auto focus system which includes lens means that produces first and second radiation patterns of a scene, the patterns being similar and in a relative first condition when the lens means is in a proper focus position, in a relative second condition when the lens means is on a first side of the proper focus position and in a relative third condition when the lens means is on a second side of the proper focus position comprising, in combination;

a first radiation detector positioned to receive radiation corresponding to a first position in the first pattern and to produce a first signal in accordance therewith;

a second radiation detector positioned to receive radiation corresponding to a second position in the first pattern and to produce a second signal in accordance therewith;

a third radiation detector positioned to receive radiation corresponding to a first position in the second pattern and to produce a third signal in accordance therewith;

a fourth radiation detector positioned to receive radiation corresponding to a second position in the second pattern and to produce a fourth signal in accordance therewith; and signal receiving means connected to said first, second, third and fourth detectors to receive the first, second, third and fourth signals respectively therefrom and to produce a resultant signal representative of the absolute value of the difference between the first signal and the fourth signal less the absolute value of the difference between the second signal and the third signal, the resultant signal having a first characteristic when the patterns are in the relative second condition and having a second characteristic when the patterns are in the relative third condition, as an indication of lens being on the first or second side respectively of the proper focus position.

2. Apparatus according to claim 1 wherein the first and second radiation detectors are members of a first array of radiation detectors all of which are positioned to receive radiation corresponding to the first pattern at different positions therein and to produce output signals in accordance therewith, the third and the fourth radiation detectors are members of a second array of radiation detectors all of which are positioned to receive radiation corresponding to the second pattern at different positions therein and to produce output signals in accordance therewith, said signal receiving means is operable to be connected to all of the detectors in the first and the second array to receive the output signals therefrom and the resultant signal is representative of the sum of the absolute value of the difference between successive outputs from detectors in the first array and detectors in the second array less the absolute value of the difference between alternate successive outputs from detectors in the first array and detectors in the second array.

3. Apparatus according to claim 2 wherein the detectors of the second array are positioned similarly to detectors of the first array and receive substantially the same radiation as the detectors in the first array when the lens means is in a proper focus position so that the resultant signal has a predetermined magnitude; the detectors of the second array receiving different radiation from the detectors of the first array when the lens means is not at the proper focus position so that the first characteristic of the resultant signal is a magnitude which is greater than the predetermined magnitude when the lens means is on the first side of the focus position and the second characteristic of the resultant signal is a magnitude which is less than the predetermined magnitude when the lens means is on the second side of the proper focus positions.

4. Apparatus according to claim 3 wherein the predetermined magnitude is substantially zero and the first characteristic is positive and the second characteristic is negative.

5. Apparatus according to claim 1 further including responsive means connected to said signal receiving means to receive the resultant signal and to provide an indication of the characteristic.

6. Apparatus according to claim 5 wherein the responsive means is connected to the lens means to move the lens means toward the proper focus position.

7. Apparatus of the class described comprising, in combination:

a first plurality of radiation detectors $A_1, A_2, A_3 \ldots A_m$ mounted in a first array with each detector operable to produce an output $a_1, a_2, a_3 \ldots a_m$ representative of the radiation received thereby;

a second plurality of radiation detectors $B_1, B_2, B_3 \ldots B_m$ mounted in a second array with each detector operable to produce an output $b_1, b_2, b_3 \ldots b_m$ representative of the radiation received thereby;

radiation transmissive means for transmitting radiation from a remote object so as to produce first and second radiation patterns at the first and second arrays respectively, when said radiation transmission means is in a first position relative to the remote object the first and second patterns produce substantially equal radiation on detectors having the same subscripts in the first and second arrays, when said radiation transmission means is in a second position relative to the remote object the first and second patterns change so that detectors with the same subscripts in the first and second arrays normally receive different radiation; and signal responsive means connected to the detectors of the first and second arrays to receive the output signals therefrom and to produce a resultant output which varies with the absolute value of the difference between the output $a_1$ and the output $b_2$ less the absolute value of the difference between the output $a_2$ and the output $b_1$.

8. Apparatus according to claim 7 wherein the resultant output of said signal responsive means varies in accordance with the expression:

$$\sum_{1}^{m-1} |a_n - b_{n+1}| - |a_{n+1} - b_n|$$

where m is the number of detectors in the first and second array and $a_n$ is the output from a detector from the first array, $a_{n+1}$ is the output from the next successive detector in the first array, $b_n$ is the output from a detector from the second array and $b_{n+1}$ is the output from the next successive detector in the second array.

9. Apparatus according to claim 8 wherein each detector of the first array is mounted in a pair with a detector of the second array.

10. Apparatus according to claim 7 including further means connected to said signal responsive means to receive the resultant output and to produce a characteristic signal indicative of the sign of the resultant output.

11. Apparatus according to claim 10 further including motive means connected to said further means to receive the characteristic output and to move said moveable radiation transmission means in accordance therewith.

* * * * *